UNITED STATES PATENT OFFICE.

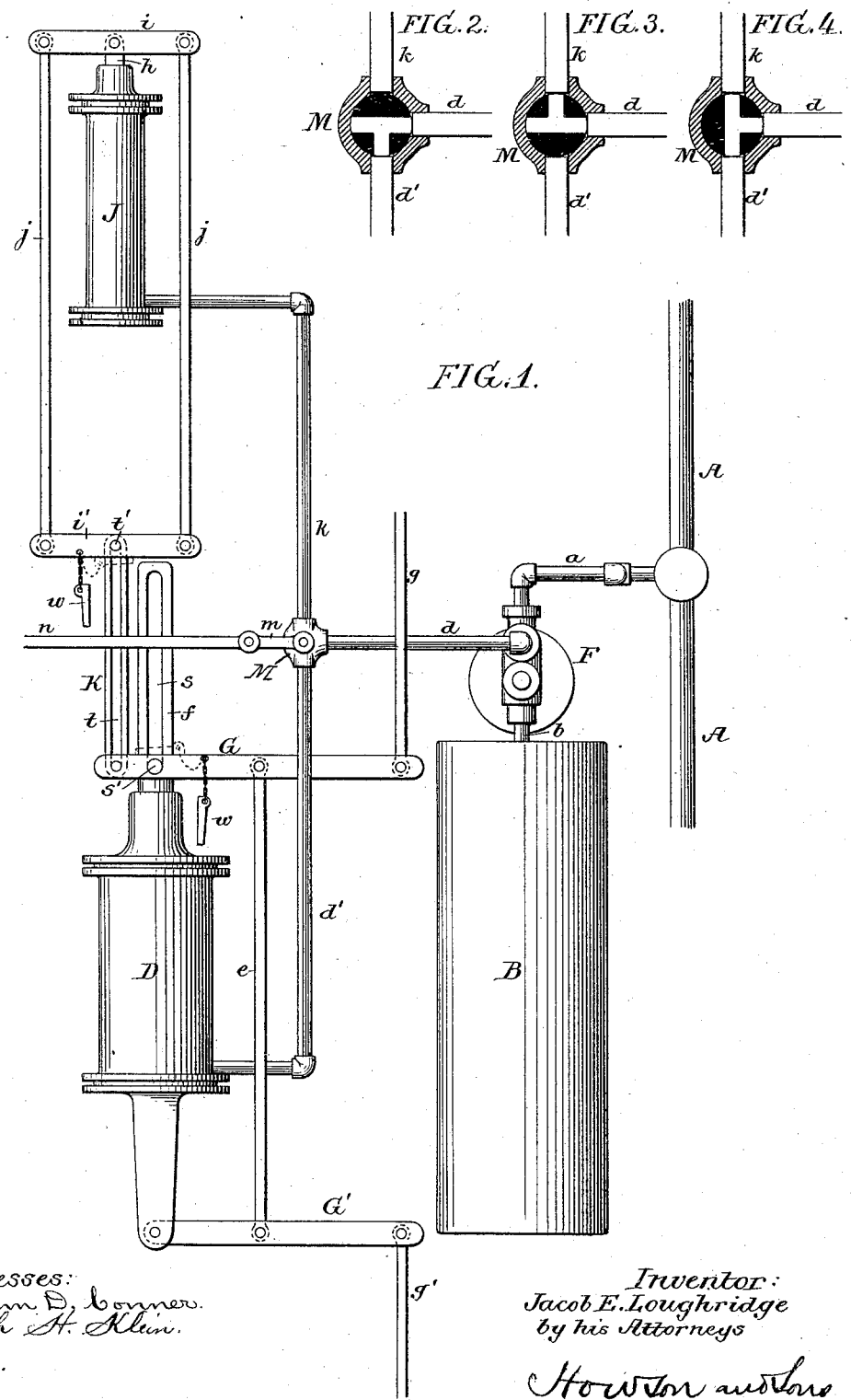

JACOB E. LOUGHRIDGE, OF PHILADELPHIA, PENNSYLVANIA, ASSIGNOR OF ONE-EIGHTH TO JAMES McCORMICK, OF SAME PLACE.

BRAKING MECHANISM FOR RAILROAD-CARS.

SPECIFICATION forming part of Letters Patent No. 368,842, dated August 23, 1887.

Application filed March 29, 1887. Serial No. 232,879. (No model.)

*To all whom it may concern:*

Be it known that I, JACOB E. LOUGHRIDGE, a citizen of the United States, residing at Philadelphia, Pennsylvania, have invented certain Improvements in Braking Mechanisms for Railroad-Cars, of which the following is a specification.

The object of my invention is to so construct an atmospheric or vacuum brake for railroad-cars that the power of the brake can be graduated to accord approximately with the weight of the car, whereby the force applied to the brakes, while sufficient to exert the maximum braking effect, will not be such as to lock the wheels and cause "skidding" or sliding of said wheels upon the rails.

In the accompanying drawings, Figure 1 is a plan view of sufficient of the braking mechanism of a car to illustrate my invention; and Figs. 2, 3, and 4, views representing in different positions a cock forming part of the apparatus.

I have shown my invention as applied to the well-known automatic brake mechanism, although it may be applied to the simpler forms of atmospheric brakes or to vacuum brakes as well.

As shown in the drawings, A represents the main pressure-pipe extending beneath the cars of the train; B, the auxiliary pressure-reservoir under the car; D, the brake-cylinder; F, the triple valve, and $a$ $b$ and $d$ $d'$ pipes, forming, respectively, the communications between said valve and the main air-pipe, the pressure-reservoir, and the brake-cylinder.

The piston-rod $f$ of the brake-cylinder is usually connected to a lever, G, having a rod, $g$, leading to the braking devices of one truck, said lever being connected by a rod, $e$, to a lever, G', at the opposite end of the cylinder, which lever is connected by a rod, $g'$, to the braking devices of the other truck.

In a properly-acting brake the pressure of the brake-shoe upon the wheel should be somewhat less than is necessary to overcome the adhesion of the wheel to the rail; otherwise the wheel will, in the event of excess of pressure, be locked and caused to slide upon the rail, or in case of insufficient pressure will not have its movement properly retarded.

As the adhesion of the wheel to the rail is dependent upon the weight of the car, it will be seen that the ordinary air or vacuum braking apparatus having a single brake-cylinder must necessarily fail to properly actuate the brakes in a train composed in part of light and in part of heavy cars—for instance, in a freight-train made up of cars some of which are loaded and some empty, or some loaded with heavy freight and some with light freight— for as uniform pressure is exerted upon all of the brakes it follows that if the pressure is such that the brakes exercise the maximum retarding effect on the wheels of the heavy cars the wheels of the light cars will be locked, while on the other hand, if the pressure is low enough to prevent locking of the wheels of the light cars, no proper braking effect will be exerted upon the wheels of the heavy cars.

In carrying out my invention, therefore, I provide two brake-cylinders of different area, either or both of which may be placed in communication with the pressure or vacuum pipe, the large cylinder being used to actuate the brakes if the car is loaded or heavy, and the small cylinder being employed if the car is empty or light, or both cylinders being used if the car is excessively heavy.

In the drawings, J represents the supplementary cylinder of contracted area, the piston-rod $h$ of the cylinder being provided with a cross-head, $i$, which is connected by rods $j$ to a second cross-head, $i'$, the latter being connected by a link, K, to the lever G of the brake-actuating mechanism. The pipe $d$ is connected to one branch of the casing of a cock, M, another branch of which is connected to the pipe $d'$, leading to the main brake-cylinder D, while a third branch is connected to a pipe, $k$, leading to the supplementary cylinder J. The plug of the cock M has a through port with a lateral branch, so that when said plug is adjusted to the position shown in Fig. 2 the cylinder D only is in operation, while when the plug is adjusted to the position shown in Fig. 3 the cylinder J only is in operation, and when the parts are in the position shown in Fig. 4 both cylinders are in operation. The plug of the cock has an arm, $m$, provided with an operating-rod, $n$, extending to the side of the car, so that the brakeman or conductor of the train can readily adjust the cock of each car to either of the positions shown, the adjustment depending upon the character of the brake action best suited to said car.

The cock shown provides for three different degrees of pressure upon the brakes, with uniform pressure in the air-pipes. In practice, however, at least so far as freight-cars are concerned, but two degrees of pressure will be required, one being that necessary for a loaded car and the other that demanded for a light car; hence an ordinary two-way cock having plug with right-angled port, whereby the pipe $d$ may be placed in communication either with the pipe $d'$ or the pipe $k$, may be substituted for the cock shown; or a multiple-way cock may be dispensed with altogether, and the pipes $d'$ and $k$ simply provided with ordinary stop-valves. The multiple-way cock is preferred, however, because when it is used there is less likelihood of both cylinders being cut off from the pipe $d$ through carelessness on the part of the attendant than there would be if a separate stop-valve were used in each pipe.

It will be observed on reference to Fig. 1 that the piston-rod $f$ has a longitudinal slot, $s$, for the reception of the pin $s'$ of the lever G, and that the link K has a similar slot, $t$, for the reception of the pin $t'$ on the cross-head $i'$, the pin $s'$ being at the inner end of the slot $s$ and the pin $t'$ at the outer end of the slot $t$ when the pistons in the cylinders D and J are retracted. By this means the movement of the piston in one cylinder does not cause a corresponding movement of the piston in the other cylinder, the link K sliding on the pin $t'$ when the lever G is operated by the push of the piston-rod F, and the pin $s'$ sliding in the slot $s$ when the lever G is operated by a pull upon the link K.

When both cylinders are in action, the pin $s'$ may be confined in position at the inner end of the slot $s$ by means of a key, $w$, passed transversely through the piston-rod $f$ beyond the pin, as shown by dotted lines in Fig. 1, and similar means may be adopted for effecting the rigid connection of the cross-head $i'$ to the link K in addition to or in place of the rigid connection of the lever G to the rod $f$, as also shown by dotted lines in Fig. 1.

As before remarked, my invention can be adopted in connection with any of the ordinary air-pressure or vacuum-brake mechanisms now in use, as well as with the automatic brake mechanism which I have selected as the medium for illustrating my invention; hence, so far as said invention is concerned, the pipe $d$ is simply to be regarded as an air-pressure or vacuum pipe, without reference to the particular mechanism beyond the same.

I claim as my invention—

1. The combination, in air or vacuum brake mechanism for railroad-cars, of two brake-applying cylinders of different area and means whereby communication may be established between either of said cylinders and the air-pressure or vacuum pipe, all substantially as specified.

2. The combination, in air or vacuum brake mechanism for railroad-cars, of each set of brake-operating devices with two brake-applying cylinders, and means whereby the air-pressure or vacuum pipe may be placed in communication with either or both of said cylinders, all substantially as specified.

3. The combination of the two brake-applying cylinders, the air-pressure or vacuum pipe $d$, and the branch pipes $d'$ and $k$, with a multiple-way cock at the junction of said pipes $d$, $d'$, and $k$, all substantially as specified.

4. The combination of the primary lever G of the brake mechanism with the two brake-operating cylinders, the piston-rod of each of which has a slotted connection with the lever, whereby the movement of one piston-rod does not affect the other, all substantially as specified.

5. The combination of the primary lever G of the brake mechanism, the two cylinders, slotted connections between the piston-rods of the same and the lever, and means for effecting the rigid connection of the lever to one of said piston-rods, all substantially as specified.

6. The combination of the primary lever G of the brake mechanism, the cylinder D, having a piston-rod connected to the said lever, the cylinder J, having a piston-rod, $h$, and a pair of connected cross-heads, and a link serving as the means for connecting said piston-rod to the lever, all substantially as specified.

In testimony whereof I have signed my name to this specification in the presence of two subscribing witnesses.

JACOB E. LOUGHRIDGE.

Witnesses:
  WILLIAM D. CONNER,
  HARRY SMITH.